A. L. HAWKESWORTH.
DRILL.
APPLICATION FILED SEPT. 19, 1921.

1,422,264. Patented July 11, 1922.
3 SHEETS—SHEET 1.

INVENTOR
Arthur L. Hawkesworth.
By Harry A. Benner
ATTORNEY

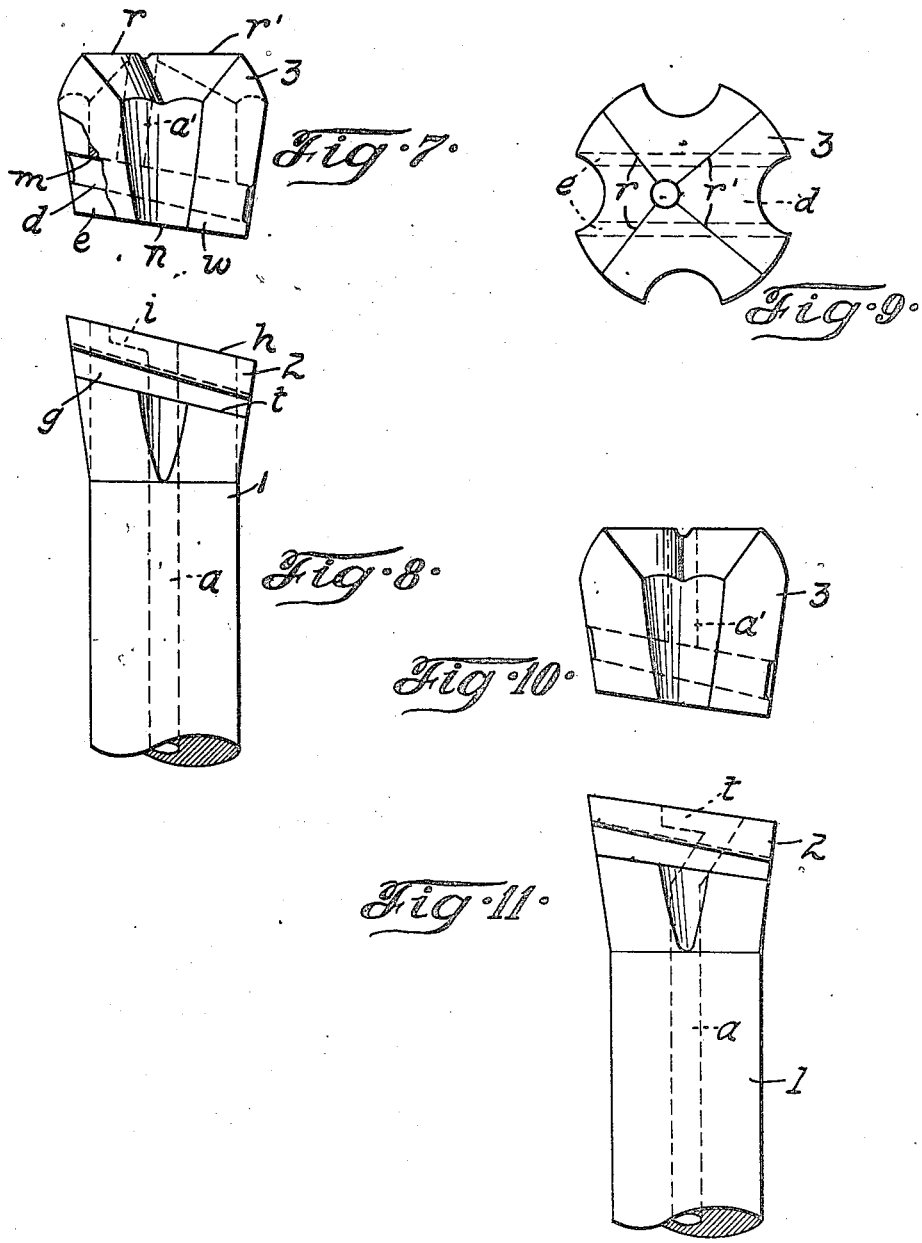

A. L. HAWKESWORTH.
DRILL.
APPLICATION FILED SEPT. 19, 1921.
1,422,264.
Patented July 11, 1922.
3 SHEETS—SHEET 3.
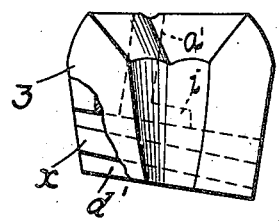
Fig. 10.
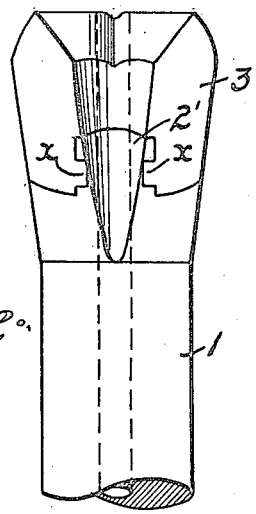
Fig. 12.
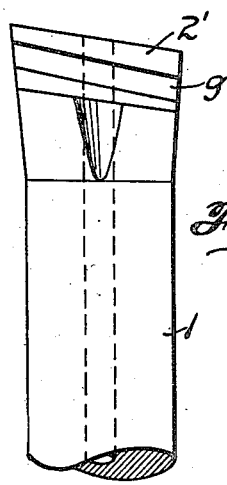
Fig. 17.
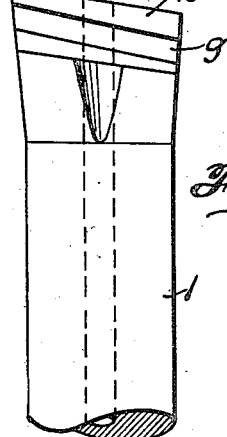
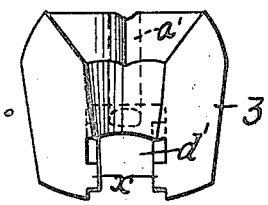
Fig. 13.
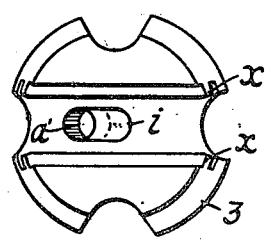
Fig. 15.
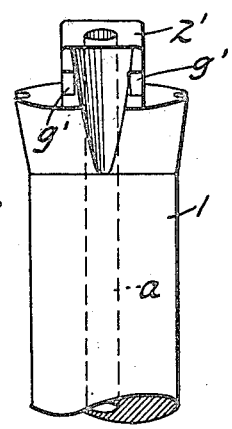
Fig. 14.
INVENTOR
Arthur L. Hawkesworth.
By Harry A. Bennier
ATTORNEY

UNITED STATES PATENT OFFICE.

ARTHUR L. HAWKESWORTH, OF BUTTE, MONTANA.

DRILL.

1,422,264.

Specification of Letters Patent. Patented July 11, 1922.

Application filed September 19, 1921. Serial No. 501,585.

*To all whom it may concern:*

Be it known that I, ARTHUR L. HAWKESWORTH, a citizen of the United States, residing at Butte, in the county of Silverbow and State of Montana, have invented certain new and useful Improvements in Drills, of which the following is a specification.

The present invention is directed to improvements in drills, and has for its object to provide a detachable bit or cutting end for a drill bar or shank for the purpose of drilling holes in rocks, in the ground, or in any hard substance whatsoever. A further object is to provide means for fastening the bit in such a way as to insure its retention on the bar or shank while in service, and yet permit instant removal of the bit when desired, as for example when it becomes necessary to detach an old bit and attach a new one, or when a bit is removed from the shank for safekeeping in a tool chest, or detached for purposes of sharpening, or for any other purpose. Further objects are to provide a bit the cutting edges of which will not all follow in the same path, thus increasing the speed of the cutting action; one having a water hole in the shank offset from that in the bit so as not to get plugged up with dirt or cuttings; and one possessing further and other features, the advantages of which will be fully apparent from the following detailed description in connection with the accompanying drawings, in which—

Figure 1:
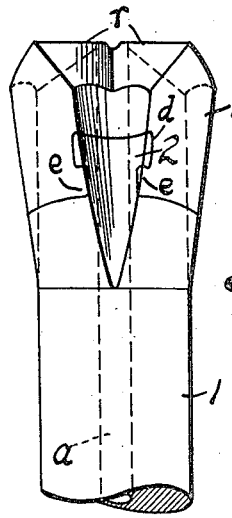
Figure 2:
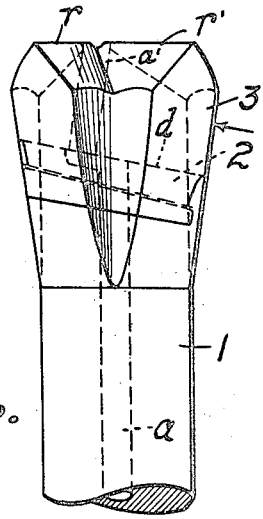
Figure 3:
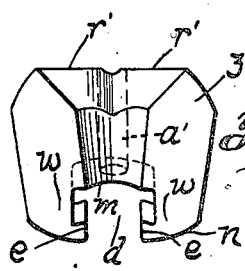
Figure 5:
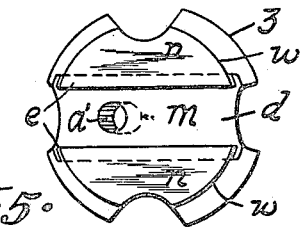
Figure 4:
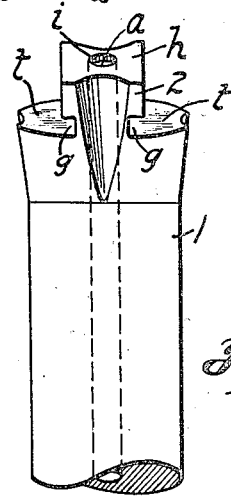
Figure 6:
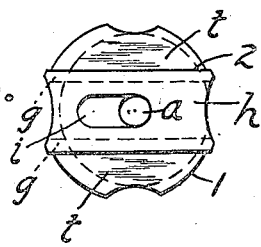

Figure 1 represents an elevation of a drill turned so as to present the large end of the wedge at the top of the tongue of the shank and the small end of dove-tail groove in the tongue engaged by the corresponding groove and tongue on the bit; Fig. 2 is a side elevation of the drill with parts broken away; Fig. 3 is an elevation of the bit detached from the shank and turned the same as in Fig. 1; Fig. 4 is an elevation of the shank turned the same as in Fig. 1; Fig. 5 is a bottom plan of the bit; Fig. 6 is an end view of the shank showing in plan the terminal tongue thereof received by the groove of the bit; Fig. 7 is a side elevation of the bit turned to present opposite cutting edges of unequal length; Fig. 8 is a side elevation of the shank end with bit removed; Fig. 9 is a top plan of the bit showing the cutting edges centered outside the rotation axis with relation to the shank; Figures 10 and 11 represent a modified form of bit and shank, the water-hole offset being in the shank instead of in the bit; Figures 12, 13, 14, 15, 16 and 17 are views similar to Figures 1, 3, 4, 5, 7, and 8 respectively, showing, however, a modification wherein the tapering tongue and groove are replaced by a rib and groove with parallel sides.

Referring to the drawings, 1 represents a drill-bar or shank provided with a central or axial passageway or duct $a$ for the flow of water or air usually employed in drilling operations as well understood in the art. The shank terminates at one end (the end opposite that from which the same is operated) in a tongue 2 which is inclined toward the bit or away from the operating end of the shank. The side walls of the tongue 2 are provided with dove-tail grooves $g$ tapered the length of the tongue toward the operating end of the shank, i. e. the wide ends of the grooves are toward the bit, or cutting end of the tool. The tongue 2 is bounded by offsets $t, t$, disposed in a common transverse plane inclined to the axis of the shank, said plane being parallel to the plane of the top face $h$ of the tongue. The tongue 2 has a groove depression $i$ on its face $h$, said groove communicating with duct $a$ in the shank. The offset groove $i$ need not be in the shank, but may be in the bit, or it may be disposed at an angle anywhere around the shank as in Figures 10 and 11. The offsets $t, t$, and face $h$, form the supporting surfaces for the detachable bit 3 which is formed with a groove $d$ for receiving the tongue 2 of the shank, said groove conforming in inclination with said tongue, the inner faces of the bounding or side walls $w$ whereof engage the sides of the tongue, said faces having dove-tail tongues $e, e$ adjacent their lower edges, said tongues being tapered to conform with the taper of the grooves $g$ in the shank which receive said tongues. Obviously the wide ends of the grooves $g, g$ receive the narrow ends of the tongues $e, e$, and as the tongues ride downwardly in the grooves they will gradually become tighter until firmly wedged in place, at which time the shank and bit are in alinement and top face $m$ of the groove $d$ will bear on top face $h$ of the tongue 2, and bottom faces $n, n$ of walls $w$ will bear on the offsets $t, t$. It will be seen from the foregoing that a pressure on the shank in the line of the axis thereof will tend to drive the drilling end of the shank "upward" along the inclined plane of the groove bottom, or what amounts to the same thing, tend to force the bit "downward" along the inclined plane of the face *h* of the tongue, thereby tending to tighten the bit on the shank during the drilling operation rather than to loosen it. On the other hand, to detach the bit from the shank all that is necessary is to tap the bit on the side of the narrow ends of the tongues *e* thereby forcing the bit across the longitudinal axis of the shank toward the wide end of the grooves *g*, or in the direction shown by the arrow in Fig. 2, the bit readily slipping off the tongue.

The cutting edges, it will be observed (Fig. 9), are not all the same length, two adjacent edges *r, r*, being shorter than the opposite edges *r', r'*, and said edges converging at a point offset from the center of the shank. The object of thus disposing the cutting edges of the bit is to increase the cutting speed of the bit and at the same time prevent the clogging of the port *a* by chips or dirt. Then too, any core that might be left by the shorter edges *r, r* would be cut off by the edges *r', r'*. A port *a'* traverses the bit from the intersection of the cutting edges to a point where said port *a'* will communicate with the offset groove *i* out of alinement with port *a*, thus preventing dirt or cuttings from entering said port and clogging the same.

In the modification, Figures 12 to 17 inclusive, I provide ribs *x* on the inside walls of the groove *d'* of the bit, said ribs being of uniform width throughout their length but inclining on the walls. The shank has corresponding grooves *g'* in the tongue 2' for receiving the ribs. In this form the wedging action takes place between the tongue 2' and groove *d'*.

It would, of course, fall within the spirit of my invention to reverse the tongues and grooves, the reversal of the positions of these parts being in no wise a departure from the generic idea contemplated by the invention. The invention is, of course, applicable to any reciprocating or rotating shank, bar, or other member employed for drilling or boring purposes, to which a bit or cutting end may be applied and to which it may be detachably secured.

It will be seen from the foregoing that the coupling means by which the bit is secured to the drill bar or shank is such as to cause the bit to be locked or tightened to the shank by a relative movement of the parts across the axis of the shank in a given direction, the bit becoming loosened from the shank by a corresponding movement of the parts in the opposite direction.

Having described my invention, I claim:

1. In combination with a drill-bar or shank terminating at one end in a tongue, the side walls of which are provided with grooves having one wall inclined to the shank offset at the base of the tongue, a bit movable across the axis of the shank and provided with an open-ended groove to receive the tongue, and tongues projecting from the walls of said groove for cooperating with the grooves in the side-walls of the shank tongue.

2. In combination with a drill-bar or shank, a bit detachably mounted thereon and movable across the axis of the shank in a direction so as to tighten on the shank during the drilling operation, said shank being provided with a port throughout its length, said bit also being provided with a port offset from the port in the shank and communicating therewith.

3. In combination with a drill-bar or shank, a detachable bit cooperating therewith, said bit being provided with a series of cutting edges converging to a point eccentric with the center of rotation of the shank, said shank and bit being traversed by a water-hole having an outlet at the convergence of the cutting edges.

4. In combination with a drill-bar or shank, a bit movable across the axis of the shank and detachable therefrom, said bit being provided with a series of cutting edges of non-uniform length and converging to a point outside the geometrical center of the cutting face of the bit.

5. In combination with a drill-bar or shank, a bit movable across the axis of the shank and detachable therefrom, said bit being provided with a series of cutting edges of non-uniform length and converging to a point outside the geometrical center of the bit, said shank being traversed by a port from end to end, and the bit having a port extending from the center of the cutting edges to a point offset from the port in the shank, the aforesaid ports being connected by a by-pass.

6. In combination with a drill-bar or shank terminating at one end in a tongue, the side walls of which are provided with grooves having one wall inclined to the shank offset at the base of the tongue, a bit movable across the axis of the shank and provided with an open ended groove to receive the aforesaid tongue, ribs projecting from the walls of said groove for cooperating with the grooves on the side walls of the shank tongue, and cutting edges on the bit opposite said open ended groove, said cutting edges converging to a point eccentric with the center of rotation of the shank.

7. In combination with a drill-bar or shank terminating at one end in an inclined tongue, the side walls of which are provided with grooves having one wall inclined to the shank offset at the base of the tongue, a bit movable across the axis of the shank and provided with an open ended groove to receive the tongue, ribs projecting from the walls of said groove for cooperating with the grooves on the tongue to effect a tightening of the bit on the shank during the drilling operation, the aforesaid bit having a plurality of cutting edges of non-uniform length opposite the groove and a port extending therethrough from the cutting edges to the base of the groove, the aforesaid shank also having a port extending longitudinally therethrough and out of alinement with the port in the bit, said ports being in communication.

8. In combination with a drill-bar or shank, a bit detachably mounted thereon, said shank having a water-hole extending longitudinally therethrough, and the bit also being provided with a water-hole extending in the same general direction with that of the shank but out of alinement therewith.

9. In combination with a drill-bar or shank terminating at one end in a tongue disposed at an incline with relation to the axis of the shank, the side walls of said tongue being provided with grooves having one wall inclined to the shank offset at the base of the tongue, a bit movable across the axis of the shank and provided with an open ended groove for receiving the tongue, and tongues projecting from the walls of said groove for cooperating with the grooves in the side walls of the shank tongue to tighten the bit on the shank during the drilling operation, the shank tongue having a depression in its top face and a longitudinally disposed port communicating with one end of said depression, and the bit having a port extending axially therethrough communicating with the opposite end of said depression.

In testimony whereof I hereunto affix my signature.

ARTHUR L. HAWKESWORTH.